March 20, 1962  A. G. LAUCK  3,025,637
GOB GUIDING APPARATUS
Filed Jan. 21, 1958  4 Sheets-Sheet 1
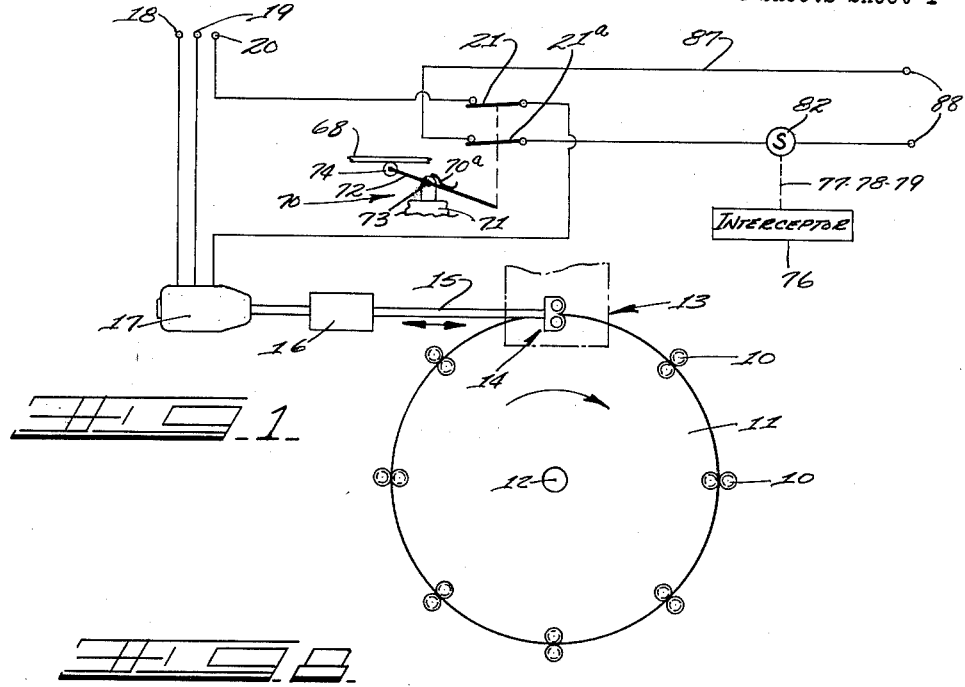
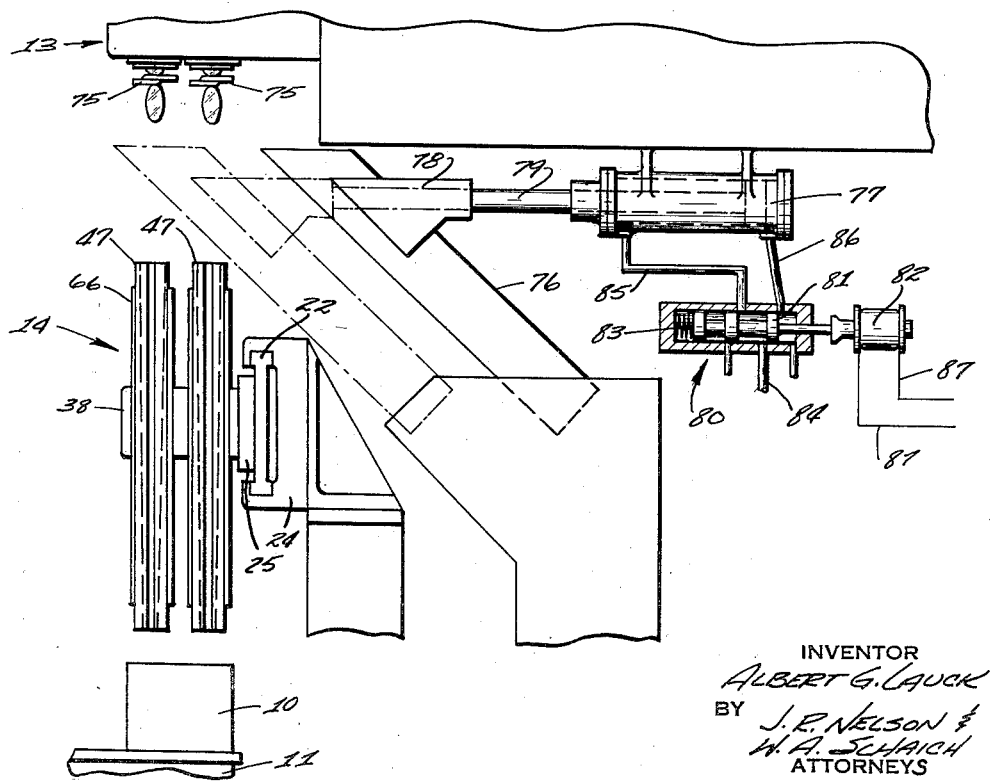
INVENTOR
ALBERT G. LAUCK
BY J. P. NELSON &
W. A. SCHAICH
ATTORNEYS March 20, 1962 A. G. LAUCK 3,025,637
GOB GUIDING APPARATUS
Filed Jan. 21, 1958 4 Sheets-Sheet 2
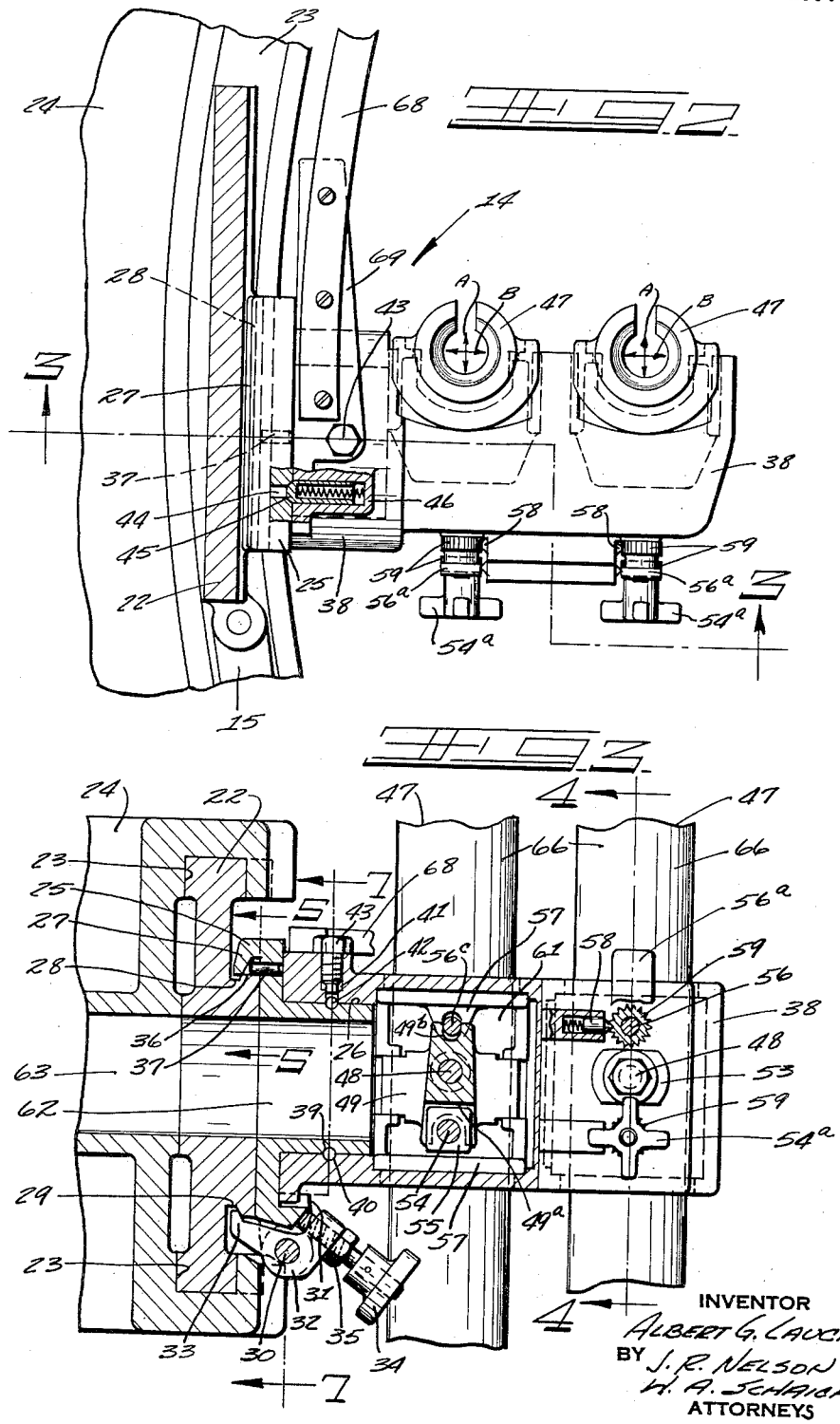
INVENTOR
ALBERT G. LAUCK
BY J. R. NELSON &
H. A. SCHAICH
ATTORNEYS March 20, 1962  A. G. LAUCK  3,025,637

GOB GUIDING APPARATUS

Filed Jan. 21, 1958  4 Sheets-Sheet 3

INVENTOR
ALBERT G. LAUCK
BY J. R. NELSON &
W. A. SCHAICH
ATTORNEYS

March 20, 1962  A. G. LAUCK  3,025,637
GOB GUIDING APPARATUS
Filed Jan. 21, 1958  4 Sheets-Sheet 4

INVENTOR
ALBERT G. LAUCK
BY J. R. NELSON
W. A. SCHAICH
ATTORNEYS

_United States Patent Office_ 3,025,637
Patented Mar. 20, 1962

3,025,637
GOB GUIDING APPARATUS
Albert G. Lauck, Toledo, Ohio, assignor to Owens-Illinois Glass Company, a corporation of Ohio
Filed Jan. 21, 1958, Ser. No. 710,341
10 Claims. (Cl. 49—14)

This invention relates to new and useful improvements in apparatus for guiding gobs of molten glass during their drop by gravity from a glass feeder to traveling molds on a forming machine.

Such apparatus is designed for use with forming machines of the type in which the mold carriage is continuously rotated about a vertical axis and brings the molds in rapid succession to a position to receive the charges or gobs of molten glass as they are delivered from the glass feeder and dropped by gravity into the molds. The mold charges or gobs, as they are dropped from the feeder to the underlying traveling molds, are given a forward movement by horizontally reciprocating guide or guides, such movement being accelerated to give the mold charges the same forward speed as the molds and in the direction of mold travel as they enter the molds at the mold loading station, the guides then being returned in the cycle for loading the next succeeding mold charges.

In such apparatus as known heretofore, the guides are mounted on a holder fabricated rigidly to the driven reciprocable cross-slide. The axial position of alignment of the guides with the molds is established during assembly and not heretofore subject to precision adjustment therewith, nor are they quickly detachable from the cross-slide so that repairs or replacements to the gob guides may be made without disassembly and consumption of a considerable amount of time. Also, the gob guides, once they are mounted, are not readily capable of fine adjustment in their mounting to secure precision loading of the gobs into the center of the mold opening. Changes in alignment or errors in aligning the feeder with the mold carriage, as well as expansion of the metallic parts of these units, often causes misalignment of the previously properly aligned gob guides and molds.

Furthermore, during operation close clearances are necessary between the bottom of the guides and the top of the molds proximate the mold loading station. Other operating parts of the forming machine that are normally retracted out of the way at the time the gob guide is decelerated in its cycle and passing across the top of the mold may malfunction, such as a failure to operate at the proper timed sequence so that they interfere with the bottom of the guides. Such interference usually results in breakage or damage to either the guides or the interfering parts of the machine.

Accordingly, one object of the invention is to provide a mounting assembly for the guides that permits horizontal adjustment of them in their mounting so that each guide may be adjusted individually either in and out radially with respect of the path of movement of the molds and advanced and retarded along this path of movement to secure precision loading of gobs in the molds.

Another object of the invention is the provision of such a precision adjustment for the guide to compensate for machine and feeder alignment error and for heat expansion of these latter-mentioned units during operations thereof.

Another object of the invention includes provision of such a mounting assembly for the guides that is quickly and easily detachable from the driven reciprocating member which carries the assembly through the reciprocating cycle.

Another object of the invention is to provide a yieldable rotatable connection for the guide mounting assembly on the driven reciprocating member so that if any interference occurs with a guide, the guide will be allowed to yield through rotation at said connection and prevent breakage or damage thereto.

A further object of the invention is the provision of a safety control feature, in connection with the above mentioned yieldable rotatable connection, wherein gobs dropped from the feeder are intercepted automatically whenever the guides are angularly displaced and misaligned from their vertically aligned operating position.

A still further object of the invention is the provision of means for stopping the reciprocating movement of the guides whenever they are angularly displaced and misaligned from their vertically aligned operating position.

Various other objects and advantages of the invention will appear hereinafter.

Referring to the accompanying drawings, which illustrate a preferred form of the invention and its associated apparatus to which it is practically adapted:

FIG. 1 is a schematic view showing the gob guide mechanism and its relation to a gob feeder and rotary table of a glass forming machine, and including electric wiring diagram for the safety control apparatus.

FIG. 2 is a plan view, partly in section, of the gob guides and their mounting assembly shown in operating position.

FIG. 3 is a sectional elevational view, taken along lines 3—3 of FIG. 2.

FIG. 8 is an elevational view, showing the relationship of the gob guide mechanism, mold and gob feeder, and includes gob interceptor mechanism operable, when activated, to intercept gobs intermediate the feeder and the top of the guides.

Figure 4:
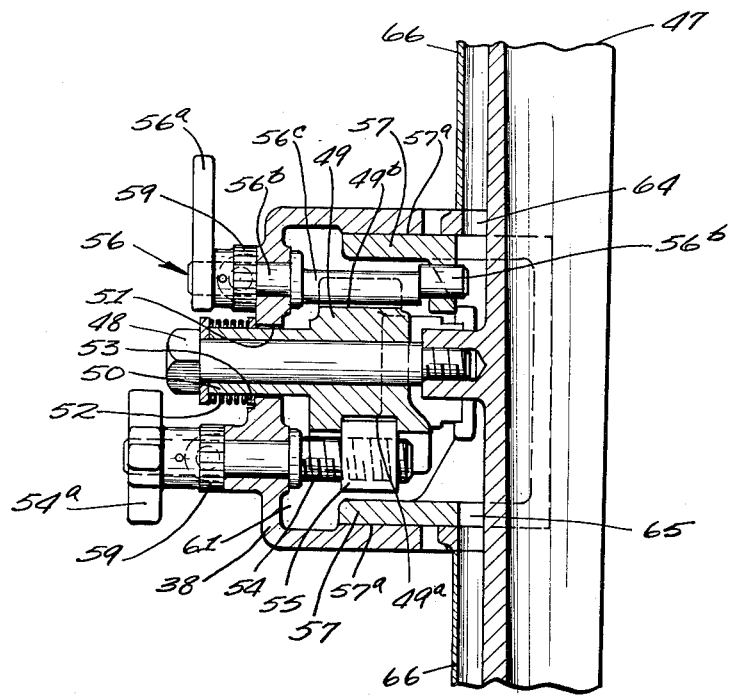
FIG. 4 is a sectional elevational view, taken along lines 4—4 of FIG. 3.

Referring to FIG. 1 but briefly, it will be seen that the invention may be applied for use with a glass forming machine having a plurality of molds 10 spaced near the periphery of a rotary table 11 of the machine. The table 11 is driven in clockwise rotation about a vertical central axis 12. The molds 10 are radially mounted in pairs in side-by-side relationship, each pair being equally spaced peripherally of the mold table 11. This arrangement illustrates the invention adapted to a double-gob operation. It should be understood, however, that the invention is adaptable to a single gob operation or other type of rotary glass forming machinery.

The table 11 is driven at constant speed by any known driving mechanism. The molds 10 pass vertically beneath a gob feeder 13. A gob guide mechanism, referred to generally at reference numeral 14, which mechanism is described hereinafter in detail, is driveably attached to a connecting rod 15 reciprocated through a predetermined length of horizontal stroke. The connecting rod 15 is driven from its other end by a transmission 16 which transforms rotary driving motion into reciprocating straight-line motion. The transmission 16 is driven by an electric drive motor 17 and is synchronized with the speed of the rotary table 11 of the forming machine so that the reciprocating motion of the gob guide mechanism 14 is properly timed with the arrival of molds 10 at their loading station. This latter-mentioned transmission and synchronizing machinery is more fully described in copending application of Guy H. Allgeyer et al., Serial No. 666,158, filed June 17, 1957, now U.S. Patent No. 2,978,619, and owned by common assignee herewith. The motor 17 is therein indicated preferably as an A.C. 3-phase induction motor connected as receiver motor of a "synchro-tie system" and having its stator windings energized from a 3-phase line source, indicated at 18, 19 and 20, hereinafter referred to as the power circuit for the motor 17. One of the phases 20 of the power circuit is connected from the source to the motor 17 through a switch 21. Switch 21 is normally held closed while the gob guides of mechanism 14 are in vertical operating position, as will be presently described. The means employed for operating switch 21 will likewise be hereinafter described.

Referring now to FIGS. 2, 3 and 4, the gob guide mechanism 14 includes cross-slide member 22 housed to slide in opposed grooves or ways 23 of a stationary supporting frame 24. The ways 23 in frame 24 are located beneath the feeder 13 and above the mold table 11. They define an arcuate path so that the slide member 22, when reciprocated, will travel in a path corresponding to the curved path of the traveling molds 10. The slide member 22 is driven by its pivotal connection with connecting rod 15, as previously described.

Outwardly on slide member 22 is provided a detachable mounting plate 25. Plate 25, in turn, has an outwardly projecting bearing surface in form of a cylinder 26. The plate 25 is held on slide member 22 by an upper integral hooked portion 27 engageable in a horizontally disposed groove 28 near the upper side of slide member 22. A similar groove 29 is provided in the slide member 22 and spaced vertically below the upper groove 28. Near the lower side of the mounting plate 25 is a pivot pin 30 that is end supported in a bracket 31 integral on plate 25. A lever arm 32 is pivotally mounted on pin 30, its outermost end having a hooked portion 33 correspondingly shaped to fit in groove 29 and be engaged thereat. When assembled, the mounting plate 25 is secured by turn screw 34 threaded through the end opposite pivot pin 30 from hooked end 33 and bearing against plate 25. Screw 34 is tightened against plate 25 to impart clockwise torque to lever arm 32 and lock plate 25 onto slide 22 by gripping its hooked portion 33 onto groove 29. The screw 34 is set tight against loosening by then tightening lock nut 35.

Figure 5:
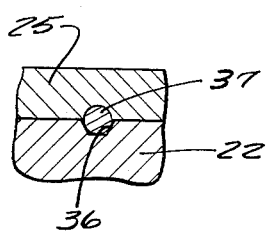
FIG. 5 is a fragmentary sectional elevational view, taken along lines 5—5 of FIG. 3.

Mounting plate 25 is oriented in its horizontally aligned position on slide 22 by a pin 37 fitting in a slot 36 in slide 22 (FIG. 5). The pin and slot connection will locate, during assembly, the mounting plate in the same position longitudinally of the cross-slide to establish the same operating position of the gob guides upon each reassembly of the unit.

The bearing surface 26 of plate 25 is insertable into an axially defined bore in gob guide holder frame 38. Intermediate the length of the bearing surface 26 is an annular groove 39. A corresponding annular groove 40 is provided within the axial bore of holder frame 38. The holder frame 38 when assembled has a radial opening 41 in axial registry with its groove 40. Steel balls 42 are dropped into the radial opening and allowed to distribute annularly about grooves 39 and 40. The balls 42 are of a diameter substantially equal to the combined radii of the grooves 39 and 40 such that they prevent axial sliding movement of the holder frame 38 on bearing surface 26. After the balls are assembled, the radial bore 41 is closed by a cap screw 43. The just-described assembly, therefore, comprises a trunnion mounting for the holder frame 38 on the mounting plate 25 which forms a rotatable connection therebetween. A yieldable means is provided to hold the holder frame 38 against rotation on the trunnion mounting, which means is preferably provided as follows.

Figure 7:
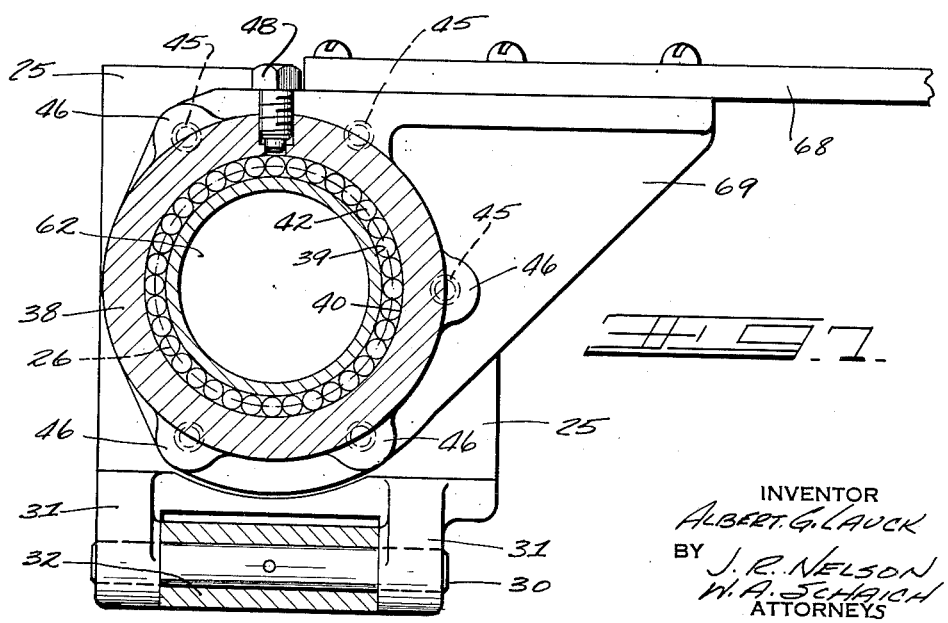
FIG. 7 is a sectional elevational view, taken along lines 7—7 of FIG. 3.

A plurality of axially disposed holes 44 are bored in mounting plate 25 and are arranged on centers around the periphery of the trunnion mounted end of the holder frame 38 (FIGS. 2 and 7). The holes 44 are chamfered or tapered to receive matching detent plungers 45 housed in a cylinder bore 46 on holder frame 38. The detent plungers 45 are spring-loaded and urged into the chamfered sides of holes 44. The spring-loaded detent plungers 45, when seated in their corresponding holes 44, normally retain the holder frame 38 in proper angular position of the trunnion mounting to establish the operating position for the assembled gob guides.

Referring now to FIGS. 2, 3 and 4, adjustable means for independently mounting each gob guide on the holder frame 38 will be described. A pair of gob guides 47 are shown which are hollow substantially U-shaped tubes or chutes which serve as guiding means for gobs of glass received from the feeder and convey the gobs therealong while falling by gravity for ultimate deposit in the molds 10 at the mold charging station thereof. Each gob guide 47 is similarly mounted and is detachably connected by a stud 48 extending through a bore defined centrally of holder element 49. The end portion 50 of holder element 49 projects through an elongated slot 51 in the holder frame 38. This slot 51 will permit both longitudinal sliding movement of holder element 49 along frame 38 and lateral shifting movement of holder element 49 with respect to frame 38. A coil spring is compressed between the outer projecting end 50 of holder element 49 and a washer 53 slidable against the holder frame 38. Spring 52 urges holder element 49 and its connected gob guide 47 laterally toward holder frame 38.

Each holder element 49 is connected independently to a lateral adjusting means forming an operative connection for advancing and retracting its gob guide 47 individually in a direction along the path of travel of molds 10 (see arrows A in FIG. 2) by an adjusting screw 54 journaled for rotation in frame 38 and threaded in a lug 55 having matching threads and slidably engaged in an underlying groove 49a to permit sliding movement of the lug 55 laterally of holder element 49 (FIG. 4). The adjusting screw 54 has a hand wheel 54a for manually adjusting the lateral position of the gob guide 47. For example, for right-hand threaded screw 54 and lug 55, right-hand rotation of hand wheel 54a will adjust the relative position of holder element 49 under force of spring 52 by moving its gob guide 47 toward the frame 38, thereby retracting the gob guide 47 along the path of travel of the molds 10; and left-hand rotation of wheel 54a will shift holder element 49 and its gob guide 47 away from frame 38, thereby advancing the gob guide 47 along the path of mold movement. The holder element 49 has a U-shaped slot or yoke 49b disposed longitudinally thereof at its upper portion. This yoke 49b fits around an eccentric 56c which is part of the hereinafter described longitudinal adjusting lever 56. The yoke permits lateral adjusting movement of element 49 and cooperates with the eccentric 56c during operation of the longitudinal adjustment to be presently described.

Each holder element 49 is connected independently to a longitudinal adjusting means forming an operative connection for aligning its gob guide 47 individually along a radial centerline of the rotary table 11 of the forming machine to adjust the alignment in or out of the guide 47 with respect to the path of the open end of the molds 10 (see arrows B in FIG. 2). This latter-mentioned means comprises a lever 56 pivotally mounted near its ends in frame 38 and an aligning bracket 57 of the guides (hereinafter described), and includes a handle 56a, journaled end mountings 56b and an intermediate eccentric 56c integrally connected with end mountings 56b. The eccentric 56c engages a yoke 49b of the holder element 49. The throw of eccentric 56c shifts holder element 49 in either longitudinal direction along frame 38 when actuated, or retains its setting otherwise. This longitudinal adjustment is made by rotation of handle 56a and the resultant leverage exerted by eccentric 56c on the holder element 49 through its yoke 49b. Both adjusting means, screw 54 and lever 56, are held in their set positions by engagement of spring loaded ratchets 58 against the teeth of corresponding ratchet wheels 59 keyed onto the outer-end portions of each of these adjusting means.

An aligning bracket 57 is rigidly connected to each gob guide 47 and has a pair of opposed surfaces 57a which lie normal to the vertical axis of its gob guide 47. When each guide 47 is assembled on holder frame 38, these surfaces 57a fit snugly between matching horizontally disposed surfaces in the holder frame 38 and are slidable both laterally and longitudinally with respect to said frame to permit the aforementioned adjustments for the gob guide. This assembly of the aligning brackets 57 and frame 38 accomplishes two advantages, namely, it provides a vertical alignment of the gob guides 47 on the frame 38 and defines together with the frame 38 a channel 61 which acts as a wind box for transmitting cooling air to the exterior surfaces of the gob guides. Channel 61 registers with the tubular passage 62 in the trunnion mounting of mounting plate 25. Cooling air is supplied into a chamber 63 in the frame 24 and is continuously supplied to passage 62 and side-by-side channels 61 during reciprocating operation of the mechanism, or alternatively, the cooling air may be piped into channel 61 by flexible tubing (not shown). The cooling air thus supplied is directed through upper and lower ports 64 and 65 through aligning bracket 57 and onto the adjacent gob guide surfaces. The cooling air is then circulated along the gob guides through passages defined by jacket 66 enclosing a portion of each of them. The air leaves the jacket 66 at the end openings 67 thereof (FIG. 6).

Referring now to FIGS. 1 and 6–8, the safety control feature of the invention will be described.

During normal operation of the gob guiding mechanism, gob guides 47 are held in their trunnion mounting, previously described, in a vertical operating position so that glass gobs conducted therethrough will be guided into the open top of the molds 10 as they are traveling with the rotary table 11. As the gobs of glass are sheared and released from the feeder 13 (FIG. 8), the gob guides 47 are being propelled toward the line of fall of the gobs. Each gob enters the guiding surface of one of the guides during this latter-mentioned movement and is accelerated horizontally along the path of movement of the molds 10 during the remainder of their fall so that at the end of its fall the gob is moving at the same speed and in registry with the open top end of one of the molds. Up to that time the gob guides 47 are approaching tangentially the path of the molds and the molds and mold table are traveling at a greater rate of speed or velocity than the gob guides. Their velocities then become equal and the gob is transferred to a mold, whereupon the guides decelerate and eventually reverse direction and the mold continues at constant speed. At this point, if any malfunction of the machine occurs so as to jam up the clearance space below the gob guides an interference occurs. At this point, in view of the fact that the machine parts are traveling away from the gob guides, an interference will exert a force on the lower end of the guide 47. The force created by the interference or jam up against the lower end portion of the gob guides 47 is applied to the trunnion mounting on the cross-slide 22, previously described, as a counterclockwise turning force (FIG. 6) or torque. When this torque is sufficient to overcome the spring loading of all the detent plungers 45 (FIG. 2) to unseat them from their seats in holes 44, the holder frame 38 and gob guides 47 carried thereby will be permitted to rotate on the trunnion mounting until the guides are clear of the jam up (dotted outline in FIG. 6). The balls 42 in the trunnion mounting prevent axial movement of the frame 38 on the bearing surface 26 of plate 25 (FIG. 3).

Figure 6:
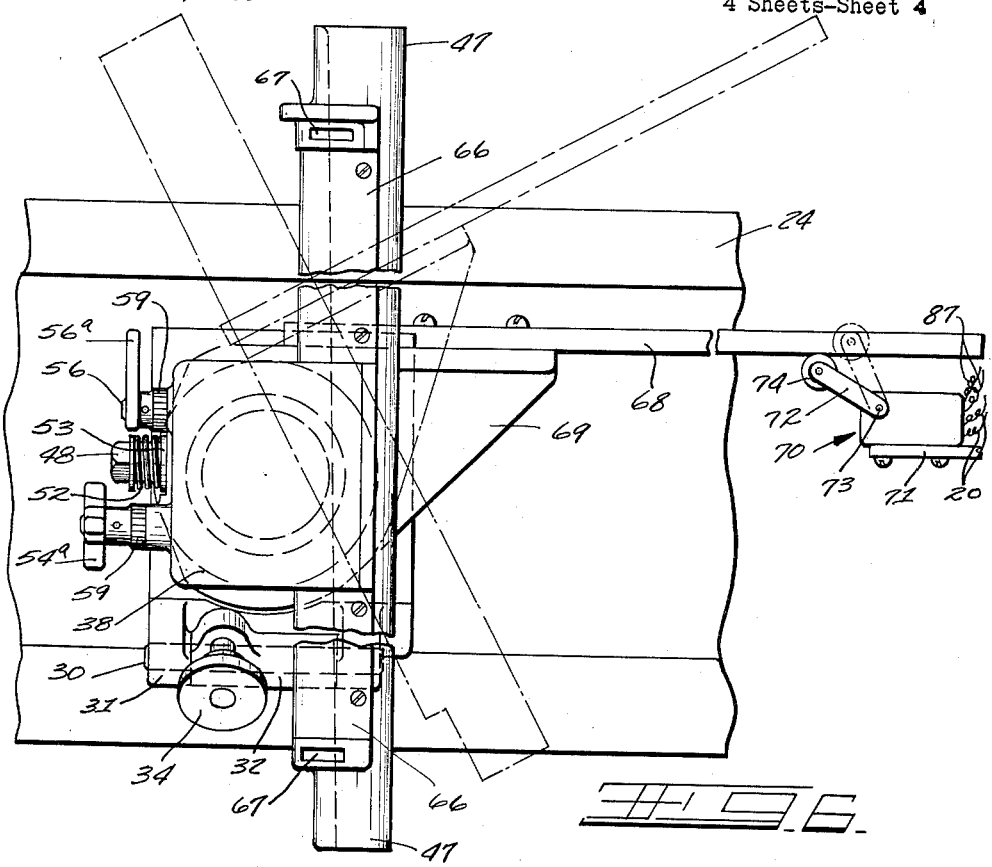
FIG. 6 is an elevational view of the gob guide mechanism, as viewed from the center of the rotary table of the forming machine of FIG. 1.

A rail arm 68 is attached to a bracket 69 integral at the top side of holder frame 38 for movement therewith (FIGS. 2 and 6). Rail arm 68 extends horizontal and parallel to the arcuate path defined by ways 23. A switch control unit 70 is mounted stationary on a bracket 71 rigidly attached to the stationary frame 24 of the gob guiding mechanism 14 and is located forward of the extremity of forward reciprocating movement of holder frame 38. A linkage 72 is pivoted on a pivot pin 73 supported by control unit 70. The outer end of linkage 72 carries a roller 74 which is normally urged into engagement with the underside of rail 68 (see schematic diagram in FIG. 1) by a spring 70a. Internally of the control unit 70 and opposite the pivot from the roller 74, is a pair of switches 21 and 21a operated to open and close by the rotation of the linkage 72 about its pivot 73. The switches 21 and 21a are normally held closed when the roller 74 is engaged to run on rail arm 68, while the latter is traveling in a horizontal plane of movement corresponding to the operating position for the gob guides 47 (FIGS. 1 and 6).

Referring now to FIG. 8, the glass interceptor mechanism will be described in connection with operation by the control unit 70. Gobs of molten glass are severed by the shears 75 of feeder 13 as the glass is delivered through the bottom outlets thereof. The gobs normally are permitted to drop by gravity to the open molds 10 and are guided thereto by the gob guiding mechanism 14, as previously described. The interceptor chute 76, which, as shown, is in the form of an inclined trough communicating with any convenient cullet receptacle, is mounted for horizontal reciprocating movement under power of a double-acting cylinder-piston assembly or motor 77. The motor 77 has a stationary mounting beneath the furnace forehearth and inwardly of feeder 13. The interceptor chute 76 is connected by a shoe 78 to the piston rod 79 of the motor 77. The piston of motor 77 is under the control of a solenoid-operated valve 80 including a valve spool 81 operated in one direction by a solenoid 82 and in the opposite direction by coil spring 83. Fluid under pressure is supplied to the valve through a pressure line 84. The valve spool 81 is held in the position shown when solenoid 82 is energized, whereby pressure is supplied through the valve and line 85 to the left-hand end of the cylinder of motor 77 for maintaining the interceptor chute 76 inactive and retracted to the position shown in full lines. When the solenoid is de-energized, the valve spool 81 is moved to the right by the spring 83, thereby connecting the pressure line 84 through pipe 86 to the opposite end of the cylinder of motor 77 for activating chute 76 by shifting it to the broken line position and thereat intercept gobs released from the feeder 13 and convey them to the cullet bin. The solenoid 82 is energized through a circuit 87 connected to an electrical source 88 and includes in that circuit switch 21a (FIG. 1). As previously mentioned, switch 21a is normally set to close circuit 87 and energize solenoid 82 to retain the interceptor chute in its inactive position. However, whenever the gob guides 47 are angularly displaced from their operating position, as shown in FIG. 6, the roller 74 will be permitted to rotate clockwise by the spring force 70a against linkage 72 and the switch 21a in control unit 70 will open circuit 87. When circuit 87 is broken so as to de-energize solenoid 82, the interceptor chute 76 will be activated to intercept glass gobs released from feeder 13. This prevents these released gobs from falling uncontrolled onto the gob guiding mechanism or onto the rotating table of the forming machine.

The above mentioned safety control unit 70 may preferably also include a second switch 21 in circuit with the phase 20 of the power circuit of the electric drive motor 17. Switch 21 is similarly held closed when the gob guides are in operating position and cooperating relationship of rail arm 68 and roller 74 of the control unit linkage. However, should the gob guides become annularly displaced from their operating position (as shown in FIG. 6), switch 21 will be opened and the power circuit phase 20 to the drive motor 17 will be interrupted or broken so that the motor 17 and related reciprocating movement of the gob guide mechanism 14 will be stopped.

The mechanism is easily reset by manually rotating the gob guide on its trunnion mounting until the detent plungers 45 again reseat themselves in the holes 44. The gob guides should then again be ready for operation. Reset of the gob guides will lower the rail arm 68 to engage roller 74 of the control unit and reset its switches 21a and 21 to closed position. This will restart the drive motor 17 and simultaneously inactivate the gob interceptor chute.

Having described one operating embodiment of the invention, it will, of course, be understood that various details of construction may be modified through a wide range without departing from the principles of this invention, and it is, therefore, not the purpose to limit the patent granted hereon otherwise than necessitated by the scope of the following claims.

I claim:

1. In a gob guide assembly for use in loading plural molds on a rotary glass forming machine each with a falling glass gob delivered through a horizontal reciprocating gob guide that is synchronized in its movement with the falling gobs and the movement of said molds as they travel in a circular path successively through a loading station for depositing the glass gobs therein, comprising a gob guide member, carriage means driven in reciprocating fashion, an adjustable mounting means attaching said gob guide member vertically on said carriage for movement bodily in an overlying path that converges to a tangential relationship to the path of the molds at said loading station, and including means adjustable for locating the gob guide member horizontally thereon in aligned operating position to receive said gobs and load them to the traveling molds, said last-named means comprising a first adjustment device for moving said guide member on the carriage means along the direction of mold movement for advancing or retarding the spatial relationship of the said guide member and said molds, and a second adjustment device for moving said guide member on the carriage means along a direction radially of the mold on the rotary machine for registration of said guide member and the molds at the loading station, a jacket member on the exterior of said guide member defining a coolant chamber around said guide member, and fluid conduit means on the carriage means connected to said coolant chamber and a supply of coolant, thereby applying said coolant to said guide member.

2. In a gob guide assembly including at least one gob guide, said assembly being mounted on a slide member adapted to be oscillated in synchronized relationship for guiding falling glass gobs intermittently severed by an overlying glass feeder to the open end of an underlying traveling mold carried by the rotatable table of a glassware forming machine, the improvement for adjusting the horizontal position of each gob guide thereof individual with respect to said underlying mold opening, said improvement comprising a holder frame connected at one longitudinal end to said slide member, a gob guide holder element for each gob guide mounted on said holder frame and adapted both for longitudinal sliding movement and lateral shifting movement with respect to said frame, a rigid connection between the inner end of said holder element and a gob guide to vertically align the latter with respect to said frame, means normally urging said holder element and gob guide in one direction of said lateral shifting movement, a first adjustable means operatively connected individually to each said gob guide to position said gob guide laterally on the frame and adjustable to shift said gob guide laterally along the frame in either an advancing or retarding direction in relation to the underlying traveling mold, and a second adjustable means operatively connected individually to each gob guide, independent of said first means, to position said gob guide longitudinally on the frame and adjustable to shift said gob guide longitudinally along the frame in either direction for radially aligning it in relation to the underlying traveling mold.

3. The apparatus defined in claim 2, wherein the gob guide assembly includes a pair of gob guides spaced longitudinally along the holder frame to correspond to pairs of side-by-side molds disposed radially of the rotary table of a glass forming machine.

4. A gob guide assembly for an oscillatory gob guiding mechanism of the class described, comprising a movable cross-slide member, a mounting plate having an outwardly projecting cylinder defining an annular bearing surface, detachable means for mounting said plate on said cross-slide member, a gob guide holder frame pivotally mounted on said bearing surface of the mounting plate, a gob guide member, a holder element connected to the gob guide member, means for attaching the holder element to said holder frame, and yieldable means for securing the holder frame against rotation on said annular bearing surface, said means permitting limited rotation of the holder on said bearing surface of the mounting plate whenever a predetermined amount of rotational force is exerted on the gob guide members.

5. A gob guide assembly for an oscillatory gob guiding mechanism of the class described, comprising a movable holder assembly including a slideable carriage member adapted for movement in oscillating fashion through a defined path of movement, a gob guide holder frame carried on said carriage member, a gob guide member, adjustable means for mounting said gob guide member on said holder frame, comprising a gob guide holder element connected to said holder frame and adapted for longitudinal and lateral movement with respect to said frame, means rigidly connecting one end of said holder element and the gob guide, means integral with said gob guide and in engagement with said holder frame for retaining said gob guide in vertical guiding alignment, a resilient means compressed between said frame and said holder element, said resilient means urging said gob guide laterally toward the holder frame, an adjusting element journaled in the holder frame and having a threaded connection for adjusting the lateral position of the gob guide with respect to the holder frame, and a lever pivotally mounted on the holder frame and having a connection for adjusting the longitudinal position of the gob guide with respect to said frame.

6. The combination defined in claim 5, wherein means integral with said gob guide for retaining it in vertical guiding alignment is provided by the holder frame defining spaced horizontal surfaces disposed intermediate the gob guide and the outer end portion of the said holder element, and an aligning bracket rigidly connected to the gob guide defining spaced surfaces substantially normal to the center line of the guiding passage of said gob guide, said latter-mentioned surfaces matching and being in slidable engagement with said horizontal surfaces on the holder frame to vertically align the gob guide.

7. The combination defined in claim 6, wherein said surfaces on the gob guide aligning bracket mounted on said spaced horizontal surfaces of the holder frame and the holder frame define a substantially rectangular channel, and connecting air passages are formed through said channel along the adjacent vertical surfaces of the gob guide, said channel and exit air passages being adapted to conduct a coolant introduced into said rectangular channel and direct said coolant along the adjacent external surface of the gob guide for cooling it.

8. A gob guide assembly for an oscillatory gob guiding mechanism of the class described, comprising a movable mounting member, a mounting plate having an outwardly projecting cylinder defining an annular bearing surface, a gob guide holder frame pivotally mounted on said bearing surface of the mounting plate, means securing the holder frame on said annular bearing surface, and detachable means for mounting said plate on the movable mounting member, comprising horizontally disposed, vertically spaced grooves along an outwardly facing, vertical surface on said mounting member, a matching hooked projection on said mounting plate adapted to be engageable in one of said grooves of said slide member, a horizontal pivot pin carried by said mounting plate and spaced vertically from said hooked projection, a lever arm pivotally mounted for rotation on said pin, the outer end of said lever arm having a similar projection corresponding to the other said groove and adapted to be engageable therein, and means engageable with said lever opposite the pivot point thereof from the projection and with said plate, said means being operable for urging rotation of said lever arm in the direction to clamp its end in the corresponding groove for rigidly and quickly detachably connecting the mounting plate onto the slide member.

9. A gob guide assembly for an oscillatory gob guiding mechanism of the class described, comprising a movable cross-slide member, a mounting plate having an outwardly projecting cylinder defining an annular bearing surface, means for mounting said plate on the movable cross-slide member, a gob guide holder frame pivotally mounted on said bearing surface of the mounting plate, a gob guide member, a holder element connected to the gob guide member, means for attaching the holder element to said holder frame, and yieldable means for securing the holder frame against rotation on said annular bearing surface permitting limited rotation of the holder on said bearing surface of the mounting plate, comprising axially disposed and tapered slot means in the outwardly facing surface of the mounting plate, matching detent plunger means adapted to fit in said slot means, a housing on said gob guide holder frame for said detent plunger means and correspondingly located thereon so that said plunger means will register with its slot means when the gob guides are in vertically aligned guiding position, retaining means on said pivotal mounting for preventing axial movement of said gob guide holder frame, resilient means in each said housing normally holding the detent plunger means in the corresponding slot means therefor to normally secure the gob guide holder frame against rotation, said resilient means being yieldable to permit withdrawal of said plunger means from its slot means whenever a predetermined torque is applied to the gob guide holder frame and thereby permit said frame to rotate on the annular bearing surface.

10. The combination defined in claim 9, wherein the retaining means on said pivotal mounting comprises an annular groove in the internal mounting surface of said gob guide holder frame, a matching annular groove in the external bearing surface of said mounting plate, both said grooves being in registry in the pivotal mounting when assembled, and a plurality of balls distributed about said grooves, said balls being of greater dimension than one of the grooves.

References Cited in the file of this patent

UNITED STATES PATENTS

| | | |
|---|---|---|
| 1,766,979 | Canfield | June 24, 1930 |
| 2,267,236 | Goodrich | Dec. 23, 1941 |
| 2,598,955 | Winder | June 3, 1952 |
| 2,665,525 | Youkers | Jan. 12, 1954 |
| 2,836,934 | McLaughlin et al. | June 3, 1958 |